United States Patent [19]

Warkentin

[11] 3,966,997

[45] June 29, 1976

[54] CHOCOLATE SOLID WAFER AND METHOD OF MANUFACTURE

[75] Inventor: Brian T. Warkentin, Sunnyvale, Calif.

[73] Assignee: Shade Foods, Inc., Belmont, Calif.

[22] Filed: Feb. 3, 1975

[21] Appl. No.: 546,300

Related U.S. Application Data

[63] Continuation-in-part of Ser. No. 423,011, Dec. 10, 1973, abandoned.

[52] U.S. Cl. .............................. 426/631; 426/601; 426/659; 426/660; 426/662
[51] Int. Cl.² .............................................. A23G 1/00
[58] Field of Search ........... 426/331, 601, 631, 659, 426/660, 662

[56] References Cited

UNITED STATES PATENTS

| | | | |
|---|---|---|---|
| 2,188,489 | 1/1940 | Veatch ............................... | 426/660 |
| 2,221,563 | 11/1940 | Young ................................ | 426/659 |
| 2,287,838 | 6/1942 | Stanley ........................... | 426/660 X |
| 2,459,908 | 1/1949 | Alikonis ............................. | 426/660 |
| 2,487,931 | 11/1949 | Lataner ............................. | 426/660 |
| 2,760,867 | 8/1956 | Kempf et al. ....................... | 426/660 |
| 3,098,746 | 7/1963 | Noznick et al ..................... | 426/660 |

FOREIGN PATENTS OR APPLICATIONS

| | | | |
|---|---|---|---|
| 672,081 | 10/1963 | Canada .............................. | 426/631 |
| 805,353 | 12/1958 | United Kingdom ................. | 426/631 |

*Primary Examiner*—S. Leon Bashore
*Assistant Examiner*—Arthur L. Corbin

[57] ABSTRACT

A substantially unsweetened homogeneous solid chocolate composition useful as an intermediate in producing chocolate fudge toppings and chocolate variegating sauces for ice cream and method for preparation thereof which composition consists essentially of 25 to 40 weight percent of cocoa determined on a fat-free basis, 30 to 40 weight percent of a mixture of hydrogenated vegetable oil and cocoa butter, 18 to 25 weight percent of starch, 0 to 10 weight percent of low fat milk powder, 0.5 to 2.0 weight percent of lecithin and 0.5 to 3.0 weight percent of salt. Small amounts of flavor imparting materials such as vanillin may be present.

2 Claims, No Drawings

CHOCOLATE SOLID WAFER AND METHOD OF MANUFACTURE

This application is a continuation-in-part of U.S. application Ser. No. 423,011 filed Dec. 10, 1973, now abandoned.

BACKGROUND OF THE INVENTION

Chocolate fudge toppings for ice cream are widely used confections. Currently they are manufactured by separately adding weighed quantities of chocolate liquor, cocoa, salt, vanillin, vegetable oil, stabilizer, emulsifier and milk powder to a measured quantity of corn syrup, sugar and water residing in a kettle. This mixture is agitated and heated in the kettle until an intimate mixture of all of the materials is produced. The resultant intimate mixture is then packed in small bottles for direct consumer use or in large cans for institutional use. Some manufacturers run the mixture produced in the kettle through a homogenizer before packing. This method of manufacture has certain disadvantages. The manufacturer is required to purchase, store, inventory, handle and weigh a large number of ingredients in formulating a kettle batch, errors are common. Unless the product from the kettle is run through a homogenizer before packing the product is frequently gritty due to the presence of large particles of cocoa powder or cocoa solids in the mixture. The product, whether the homogenization step is used or not, is a thin liquid which must be stored in the containers for as long as four to six weeks before it develops the thick creamy character of an acceptable fudge topping. Immediately after packaging, it can be poured from the container as a thin syrup, but after the four to six weeks storage period, it has thickened to the point where it must be spooned from the container and has all of the desired characteristics of a fudge topping.

It would be desirable to simplify the manufacturing procedure for topping producers by reducing the number of ingredients which they must store, inventory and measure and it would be especially desirable to enable them to avoid the four to six weeks storage period required for the product to develop a thick creamy consistency so that it is in a condition suitable for sale to the consumer.

DESCRIPTION OF THE INVENTION

Pursuant to the present invention, a solid chocolate product is produced which can be added to corn syrup, invert sugar and water, heated to elevated temperature for a few minutes to form a fudge topping which can be packaged and immediately sold for consumer use. The fudgy consistency appears promptly after the mixture is cooled and no storage period is required for the product to develop an acceptable fudgy consistency.

The components of the solid chocolate composition are as follows:

a. cocoa powder or mixtures of chocolate liquor and cocoa powder having a fat-free cocoa content in amount to constitute from 25 to 45% of the total composition. When a mixture of cocoa powder and chocolate liquor is used, the chocolate liquor should not be used in amounts that would provide more than 30% of the required fat-free cocoa. The high content of relatively low melting cocoa butter in the chocolate liquor would adversely affect the softening point of the final product if chocolate liquor were used in larger amounts;

b. fat consisting of a mixture of a minor proportion of cocoa butter and a major proportion of hydrogenated vegetable oil (MP 100-110) in amount to constitute 30% to 40% by weight of the total composition. The hydrogenated vegetable oil may be any one of the common vegetable oils such as cottonseed oil, soybean oil, safflower oil, sesame oil and the like, hydrogenated sufficiently to bring the melting point to at least 100°F. The cocoa butter content of the fat mixture can vary within the range 10–40% by weight as the proportions of chocolate liquor and cocoa used to provide the required cocoa content are varied. When only cocoa powder (10–12% cocoa butter) is used, then the cocoa butter content of the fat mixture is at the low end of the range. Increasing the proportion of chocolate liquor used raises the cocoa butter content. As noted above, the chocolate liquor should not be used to provide more than 30% of the required cocoa on a fat-free basis.

There are two reasons for holding the chocolate liquor component to this maximum level. One is economic, the chocolate liquor being considerably more expensive than cocoa; the other is technical — the melting point of cocoa butter is about 92°–94°F. The presence of large amounts of cocoa butter in the fat mixture reduces the softening point of the finished chocolate solid with the result that the relatively small pieces or wafers of solid chocolate, the most desired form for the commercial product, soften and stick together forming large masses of a which causes some difficulty in measuring and mixing with sugar syrups.

c. starch in amount to constitute 18 to 25% by weight of the total composition. The starch functions as a stabilizer and thickener. The starch used may be either natural or modified starch. Thin boiling starches, the hydrolyzed form of which have low viscosity at around 140°F. and only gelatinize when cooled to about ambient temperature, are preferred;

d. low fat (<1% fat) milk powder in amount to constitute from 0 to 10% by weight of the total composition;

e. sugar in amount to constitute from 0 to 7% by weight of the total composition. Such small amounts of sugar can be used to adjust the solids content of the charge to the milling paste mixer, if desired. Such amounts leave the total composition with a bitter chocolate flavor, substantially unsweetened and unpalatable until mixed with sugar syrup as shown in Examples 3 and 4;

f. lecithin in amount sufficient to constitute from 0.5 to 2.0% of the total composition.

Desirably, but optionally, common salt in amount to constitute about 0.5 to 3% by weight of the total composition and vanillin in amount to constitute about 1% of the total composition are added. These two materials provide flavor but could be separately added in the course of converting a composition consisting of components (a) through (f) above to a finished chocolate confection composition.

The manufacture of the solid chocolate compositions of this invention are described in the following examples.

EXAMPLE 1

Twenty-seven parts by weight of cocoa powder having a cocoa butter content of 11% by weight, 21 parts by weight of modified starch, 3.5 parts by weight of non-fat milk powder, 2 parts by weight common salt, one part by weight vanillin and 13 parts by weight of hydrogenated soybean oil having a melting point 102°F., 0.7 parts by weight of lecithin and 5 parts by weight of sugar are placed in a milling paste mixer. The mixer is run until the mixture is ground into a paste. The paste is then passed through five roll stainless steel refiners which extrude it as a very viscous paste. This extrudate is then mixed and heated with an additional 13 parts by weight of hydrogenated soybean oil and 14 parts by weight of chocolate liquor having a cocoa butter content of 51% in small ribbon blenders to reduce it to a liquid state. The liquid is pumped into a high-speed heated mixing tank where it is mixed and further milled. The liquid is heated to 140° F. and held at that temperature for about 15 minutes during which agitation is continued. The liquid product is then pumped into a storage tank from which it is fed onto a moving rubber conveyor belt. The depositing head squirts out small globs of this liquid mixture onto a moving belt which passes through a cooling tunnel where refrigerated air is circulated around it. The globs solidify, forming wafers which are carried out of the cooling tunnel and dropped into cartons. The wafers are about an inch in diameter and about three-eighths of an inch thick. The wafers have an incipient softening temperature about 94°–95°F. and melted at about 100°F. The wafers had an average weight about 1/5 ounce. They may be made larger but should not exceed about one ounce in weight to facilitate weighing to close tolerances and to facilitate melting and mixing during their use to produce the finished fudge composition.

EXAMPLE 2

Forty-two parts by weight of cocoa powder having a cocoa butter content of 11% by weight, 22.6 parts by weight modified starch, 2.9 parts by weight salt, 1 part by weight vanillin and 15 parts by weight of hydrogenated vegetable oil having a melting point 100°F., and 1.4 parts by weight of lecithin were charged to the milling paste mixer. After milling and passing through the stainless steel refiners as in Example 1, the extrudate from the refiners was mixed with an additional 15.1 parts by weight of hydrogenated vegetable oil and processing was continued as in Example 1 to produce the wafers.

The total fat content, i.e., cocoa butter plus hydrogenated coconut oil charged to the milling paste mixer should be held in a range to constitute 15 to 25% of the total charge. Holding the fat level in this range permits efficient milling and mixing to achieve the desired complete homogeneity of the mix. The remaining hydrogenated vegetable oil is added to the extrudate from the stainless steel refiners during the final mixing step which immediately precedes extrusion and cooling to produce the finished wafer. If all of the fat contained in the final finished wafer were added to the initial charge to the mill, the resulting mixture would be so low in viscosity that considerable difficulty would be experienced in achieving the desired homogeneity of the mixture in the milling step.

EXAMPLE 3

The wafers produced in Examples 1 and 2 above may be used to produce the finished fudge topping composition by heating 15 to 20 parts by weight of corn syrup having an 86% solids content, 50 to 60 parts by weight of invert sugar having a 77–78% solids content and 5 to 10 parts by weight of water in a mixer and then adding 10 to 15 parts by weight of the wafers to the liquid. The total mixture is heated with agitation to 190° to 200°F. for a period of about 10 minutes during which time starch hydrates. The mixture is then cooled and immediately packaged in containers suitably sized for consumer use. On cooling to ambient temperature, the product is a creamy fudgy chocolate topping ready for immediate consumer use. No delay is required to enable the composition to develop the fudgy consistency.

EXAMPLE 4

The wafers produced in Examples 1 and 2 above can be used to produce a creamy variegating sauce of lower viscosity than the fudge topping by mixing with sugar solutions having a higher water content than those used in preparing the fudge topping. A representative variegating sauce is obtained by mixing 13 parts by weight of the wafers of Example 1 or 2 with 25 parts by weight of sugar, 20 parts by weight of corn syrup solids and 42 parts by weight of water and heating and agitating the mixture as in Example 3.

While hydrogenated coconut oil has been used in the above examples, other hydrogenated vegetable oils having melting points above 100°F. may be substituted, if desired.

Example 3 illustrates the use of the solid chocolate product of the invention in producing a chocolate fudge topping. By reducing the water content of the mixture in Example 3, a chocolate fudge can be prepared by simply bringing the mixture of chocolate wafers and syrup to the boiling point and then pouring the hot mixture into a plate or pan where it sets up as a fudge. Long cooling and testing become unnecessary.

While the foregoing examples have indicated the quantities of the several components of the composition in parts by weight, the makeup of the composition may be expressed in terms of the percentage range of each component in the total composition as follows: 25–40% by weight of cocoa determined on a fat-free basis, 30–40% by weight of a mixture of hydrogenated vegetable oil having a melting point about 100°F. and cocoa butter, said mixture containing a minor proportion from 10–25% cocoa butter, 18–25% by weight of starch, 0–10% by weight of low-fat milk powder, 0.5–2.0% by weight of lecithin and 0–7% by weight of sugar.

The compositions described herein are not suitable for consumption as such, but are useful intermediates for use in the preparation of chocolate foods as described.

We claim:

1. A substantially unsweetened homogeneous solid chocolate composition consisting essentially of 25–40 weight percent of cocoa determined on a fat-free basis, 30–40 weight percent of a mixture of hydrogenated vegetable oil having a melting point of at least 100°F. and cocoa butter, said mixture containing 10–25% cocoa butter, 18–25 weight percent of starch, 0–10 weight percent of low-fat milk powder, 0.5–2.0 weight percent of an emulsifying agent and 0.5–3 weight percent of salt.

2. A process for producing the solid chocolate composition of claim 1 which comprises 1. charging the cocoa, starch, low-fat milk powder, emulsifying agent and salt components and approximately one-half of the hydrogenated vegetable oil component to a milling zone,
2. milling the mixture to form a paste,
3. passing the paste through a roll refining zone to obtain a viscous paste,
4. adding the remainder of the hydrogenated vegetable oil to the viscous paste from the roll refining zone,
5. heating and agitating the resultant mixture to form a homogeneous liquid,
6. raising the temperature of the liquid to a temperature in the range about 120°–150°F. and agitating it at such temperature for at least 15 minutes, and then
7. extruding small globs of the liquid not exceeding about one ounce in weight and cooling them to ambient temperature.

* * * * *